United States Patent
McNamara et al.

(10) Patent No.: US 10,066,944 B1
(45) Date of Patent: Sep. 4, 2018

(54) MULTI-MODE RECEIVER (MMR) BASED INERTIAL INTEGRATION

(71) Applicant: Rockwell Collins, Inc., Cedar Rapids, IA (US)

(72) Inventors: Jeffrey B. McNamara, West Melbourne, FL (US); James H. Doty, Cedar Rapids, IA (US); Vladislav Gavrilets, McLean, VA (US); Gilles Tatham, Fontenilles (FR); Jesse W. Oltrogge, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/473,406

(22) Filed: Mar. 29, 2017

(51) Int. Cl.
| | |
|---|---|
| *G01C 21/00* | (2006.01) |
| *G01C 21/16* | (2006.01) |
| *G01S 19/49* | (2010.01) |
| *G01P 5/165* | (2006.01) |
| *B64C 13/50* | (2006.01) |

(52) U.S. Cl.
CPC ............ *G01C 21/165* (2013.01); *G01P 5/165* (2013.01); *G01S 19/49* (2013.01); *B64C 13/503* (2013.01)

(58) Field of Classification Search
CPC ........ G01C 21/165; G01P 5/165; G01S 19/49
See application file for complete search history.

(56) References Cited

U.S. PATENT DOCUMENTS

| | | | | |
|---|---|---|---|---|
| 6,965,816 B2* | 11/2005 | Walker | ................... | B64C 13/20 244/189 |
| 7,164,383 B2* | 1/2007 | Fagan | ..................... | G01S 19/07 342/357.58 |
| 8,818,582 B2* | 8/2014 | Neri | ........................ | G01S 19/15 701/11 |

OTHER PUBLICATIONS

Philipp Clausen et al., Position Accuracy with Redundant MEMS IMU for Road Applications, European Navigation Conference GNSS, Apr. 7-10, 2015, Proceedings of the ENC-GNSS 2015, 8 pages.
Glen Gibbons, Challenges in GNSS/INS Integration, Inside GNSS, Jan./Feb. 2012, http://insidegnss.com/node/2950, 2 pages.

\* cited by examiner

*Primary Examiner* — Adam M Alharbi
(74) *Attorney, Agent, or Firm* — Angel N. Gerdzhikov; Donna P. Suchy; Daniel M. Barbieri

(57) ABSTRACT

Systems for multi-mode receiver (MMR)-based inertial integration of position solutions replace expensive IRUs with lower-grade but high-performance inertial sensors and GNSS-assisted MMRs, collecting inertial position data indicative of an aircraft position and integrating the inertial data with georeferenced position data within the MMRs. The inertial sensors may include microelectromechanical attitude and heading reference systems capable of generating coasted position solutions based on secondary inertial data and integrated with georeferenced data when it is available. The coasted position solutions may be used as a standby alternative to primary integrated solutions, or serve as an additional primary position solution.

15 Claims, 6 Drawing Sheets

MULTI-MODE RECEIVER (MMR) BASED INERTIAL INTEGRATION

CROSS-REFERENCE TO RELATED APPLICATIONS

This application relates to the following applications concurrently filed herewith and each incorporated herein by these references in their entirety: AIR DATA, ATTITUDE, AND HEADING REFERENCE SYSTEM (ADAHRS) REPLACEMENT ARCHITECTURE by Jeffrey B. McNamara, James H. Doty, Vladislav Gavrilets, and Jesse W. Oltrogge, U.S. patent application Ser. No. 15/473,366.

BACKGROUND

A common approach to providing high-integrity coasting of position and velocity data after loss of a global navigation satellite system (GNSS) position signal in space is to employ a triple inertial reference unit (IRU; also inertial measurement unit (IMU) installation whereby each of three IRUs individually produces an accurate hybrid GNSS inertial position solution. However, each IRU may have a latent sensor error, the result of which may be rapid growth in position error after loss of GNSS data. A triple-IRU installation may detect these latent errors, or faults, by voting out the "bad" IRU (e.g., an outlier whose output disagrees with the other two).

However, cost pressures on original equipment manufacturers (OEMs) are driving the reduction or elimination of expensive or redundant navigation components such as IRUs. One approach is to replace one or two IRUs of the conventional triple-IRU installation with a lower-cost option such as a GNSS-aided attitude and heading reference system (AHRS). In addition, changes in GNSS signaling and the regulatory environment will drive newer, more flexible architectures that can accommodate multiple frequencies and multiple satellite constellations. IRU and AHRS components may require frequent modification or replacement in order to adapt to these changes.

SUMMARY

In one aspect, embodiments of the inventive concepts disclosed herein are directed to a multi-mode receiver (MMR)-based navigation system. The system may include at least one inertial reference unit (IRU) for generating "pure" inertial position data via inertial position sensors. The IRU may include processors for outputting the inertial position data to MMRs of the system as well as aircraft display and flight control systems. The system may include MMRs incorporating global navigation satellite system (GNSS) receivers for receiving position signals from external satellites. The MMRs may include processors for generating georeferenced position data based on the received position signals. The MMR processors may receive the inertial position data from each IRU and generate integrated position solutions (e.g., position/velocity/time (PVT) solutions) based on the georeferenced data and the inertial data as well as a pure inertial solution based on secondary inertial sensors and/or air data. The MMR processors may output the integrated solutions to the user systems and the pure inertial solution to a standby display.

In a further aspect, embodiments of the inventive concepts disclosed herein are directed to an MMR-based navigation system. The system may include navigation-grade inertial sensors for generating inertial position data indicative of an aircraft position. The system may include MMRs incorporating GNSS-based receivers for receiving satellite-based position signals. The MMRs may include processors for generating georeferenced position data based on the received position signals. The MMR processors may receive the inertial position data from the navigation-grade inertial sensors, generating primary integrated position solutions based on the georeferenced data and the inertial position data, and outputting the integrated position solutions to user display and flight control systems of the aircraft. The AHRS may generate secondary inertial position data via secondary inertial sensors and receive secondary air data from a secondary air data module. The AHRS may include processors for receiving the georeferenced data from the MMRs and generating secondary integrated position solutions based on the georeferenced data and the inertial position data from the secondary inertial sensors, outputting the secondary integrated position solutions to the user systems. The AHRS may additionally generate pure inertial position solutions based on the secondary inertial position data and secondary air data, outputting the pure secondary inertial position solutions to a standby display.

In a still further aspect, embodiments of the inventive concepts disclosed herein are directed to a dual-MMR navigation system. The system may include primary or navigation-grade inertial sensors for generating primary inertial position data indicative of an aircraft position and secondary or microelectromechanical (MEMS) inertial sensors for generating secondary inertial position data indicative of the aircraft position. The system may include two or more MMRs, each MMR incorporating a GNSS receiver for receiving navigation signals from external satellites. Each MMR may include processors for generating georeferenced position data based on the received navigation signals. The MMR processors may receive the inertial position data from the primary and secondary inertial sensors and generate primary integrated position solutions, based on the georeferenced data and the primary inertial data, and secondary integrated position solutions, based on the georeferenced data and the secondary inertial data. The MMR processors may additionally generate pure inertial position solutions based on the secondary inertial data. The MMR processors may output the integrated position solutions to user display and flight control systems of the aircraft, and output the pure inertial solutions to a standby display.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
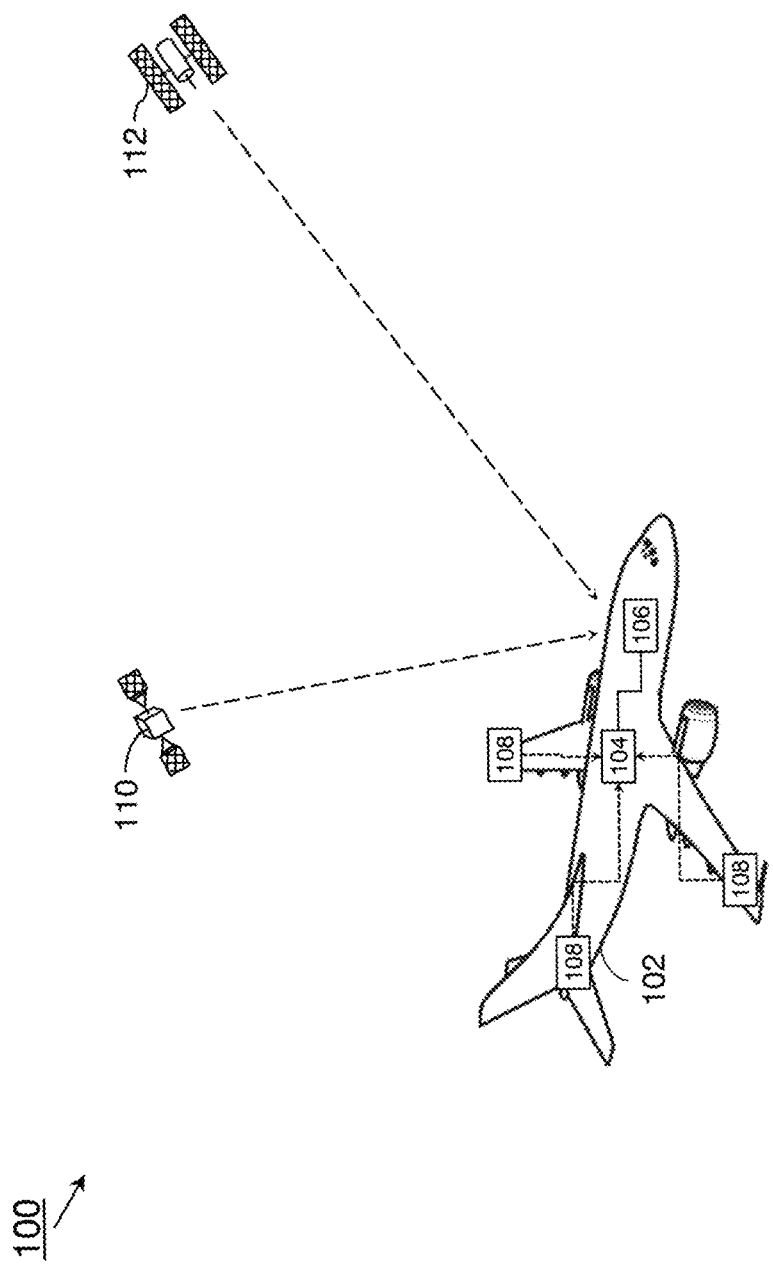
FIG. 1 is a diagrammatic illustration of an exemplary embodiment of a navigation system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to navigation systems incorporating inertial integration by GNSS-based multi-mode receivers (MMR). A conventional system configuration, incorporating three navigation-grade inertial reference units (IRU), may be modified by replacing one or more IRUs with cost-effective MMRs or high-performance microelectromechanical (MEMS) inertial sensors. The MMRs may isolate inertial sensors from satellite constellation changes by emulating IRUs, providing multiple channels of position solutions to user systems by integrating georeferenced data from their own GNSS receivers with inertial position data.

Referring now to FIG. 1, an exemplary embodiment of a navigation system 100 according to embodiments of the inventive concepts herein may be embodied aboard an aircraft 102 and include a combination of inertial reference units 104 (IRU), global navigation satellite system (GNSS) enabled receivers 106, and air data sensors 108. For example, the GNSS-enabled receivers 106 may determine a georeferenced position of the aircraft 102 based on positioning signals received from navigational satellites 110, 112. The GNSS-enabled receivers 106 may be dual-antenna receivers incorporated into multi-mode receivers (MMR) including onboard processors for determining high integrity georeferenced position solutions. The navigational satellites 110, 112 may include components of diverse constellations, e.g., GPS, GLONASS, Compass, Beidou, Galileo, transmitting in diverse signal formats. The IRU 104 may incorporate navigation-grade inertial measurement units (IMU) and inertial sensors (e.g., accelerometers, gyrometers, compasses, magnetometers) and processors for determining inertial position data (e.g., platform-referenced position, velocity, acceleration, attitude, and rotational orientation data) of the aircraft 102. This "pure" inertial position data may be combined with georeferenced position data from the GNSS-enabled receivers 106 to generate high-integrity hybrid position solutions. Hybrid position solutions may include "coasted" solutions based primarily on inertial position data, in areas where GNSS signal reception may be unreliable or unavailable. If, for example, the IRU 104 is an air-data IRU (ADIRU), air-data sensors 108 may include onboard sensor systems, e.g., pitot-static systems, angle of attack (AoA) sensors, and wing-mounted total air temperature (TAT) sensors, providing additional real-time air data (including, but not limited to, a barometric altitude, an airspeed, an angle of attack (AoA), a total air temperature (TAT), a vertical speed, and an overspeed) to the IRUs 104 via air data modules (ADM). Implementations of the system 100 may replace one or more navigation-grade IRUs 104 (a conventional configuration may incorporate three IRUs: a main IRU dedicated to the pilot and co-pilot and a backup IRU should either main IRU fail) with a lower-cost IMU such as an attitude and heading reference system (AHRS), an air data AHRS (ADAHRS), or a microelectromechanical (MEMS) AHRS/ADAHRS.

Figure 2:
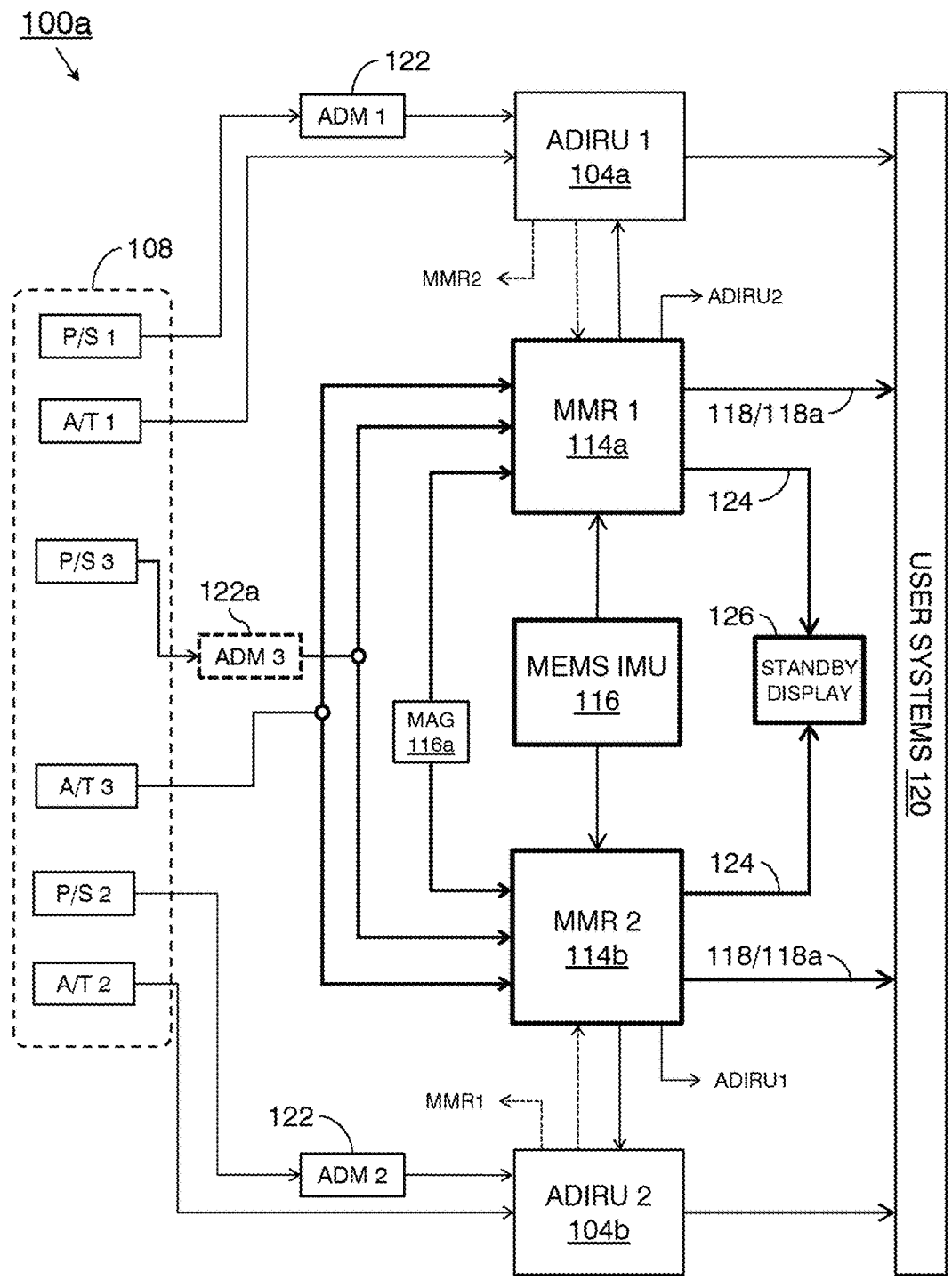
FIG. 2 illustrates the navigation system of FIG. 1 incorporating MMR-based inertial integration.

Referring now to FIG. 2, the navigation system 100a may be implemented and may function similarly to the navigation system 100 of FIG. 1, except that the navigation system 100a may include dual power supply MMRs 114a-b, ADIRUs 104a-b, and a MEMS inertial measurement unit (IMU) 116. The MMRs 114a-b may integrate georeferenced position data (based on the received satellite-based navigation signals) with inertial position data from the ADIRUs 104a-b to generate high-integrity position solutions (118), forwarding the solutions to user systems 120 of the aircraft (102, FIG. 1), which may include (but are not limited to) display systems, flight management systems (FMS), flight control systems, and fly-by-wire (FBW) systems. Because inertial integration of georeferenced position data is performed by the MMRs 114a-b rather than the ADIRUs 104a-b, the ADIRUs (as well as the MEMS IMU 116) may be isolated from changes to GNSS constellations or frequencies; only the MMRs 114a-b may require updating.

Each ADIRU 104a-b may generate pure inertial position data (including, but not limited to, a rotational attitude, a heading, an acceleration, a ground speed, or a relative position of the aircraft 102) based on navigation-grade inertial sensors. Each ADIRU 104a-b may further incorporate into its inertial position data air data from an ADM 122. In some embodiments (e.g., if the navigation system 100a is embodied in a ground-based vehicle), the ADIRUs 104a-b may be standard inertial reference units (IRU) without access to air data.

Each MMR 114a-b may generate secondary or "coasted" high-integrity position solutions (118a) by integrating the georeferenced position data with secondary inertial position data generated by the MEMS IMU 116 and output this secondary "coasted" integrated position solution 118a as an additional primary channel to the user systems 120. The MEMS IMU 116 may include secondary inertial sensors (e.g., an accelerometer, gyrometer, compass, or magnetometer 116a); the MEMS IMU 116 may receive air data from a dissimilar ADM (122a) connected to the air data sensors 108. Each MMR 114a-b may further generate a secondary (standby) GNSS-independent pure inertial position solution (124) by integrating secondary air data from the dissimilar ADM 122a and secondary inertial data from the MEMS IMU 116, the magnetometer 116a, and other secondary inertial sensors. The secondary pure inertial position solutions 124 may be forwarded to a standby display 126; e.g., for use as a standby or backup solution.

Figure 3A:
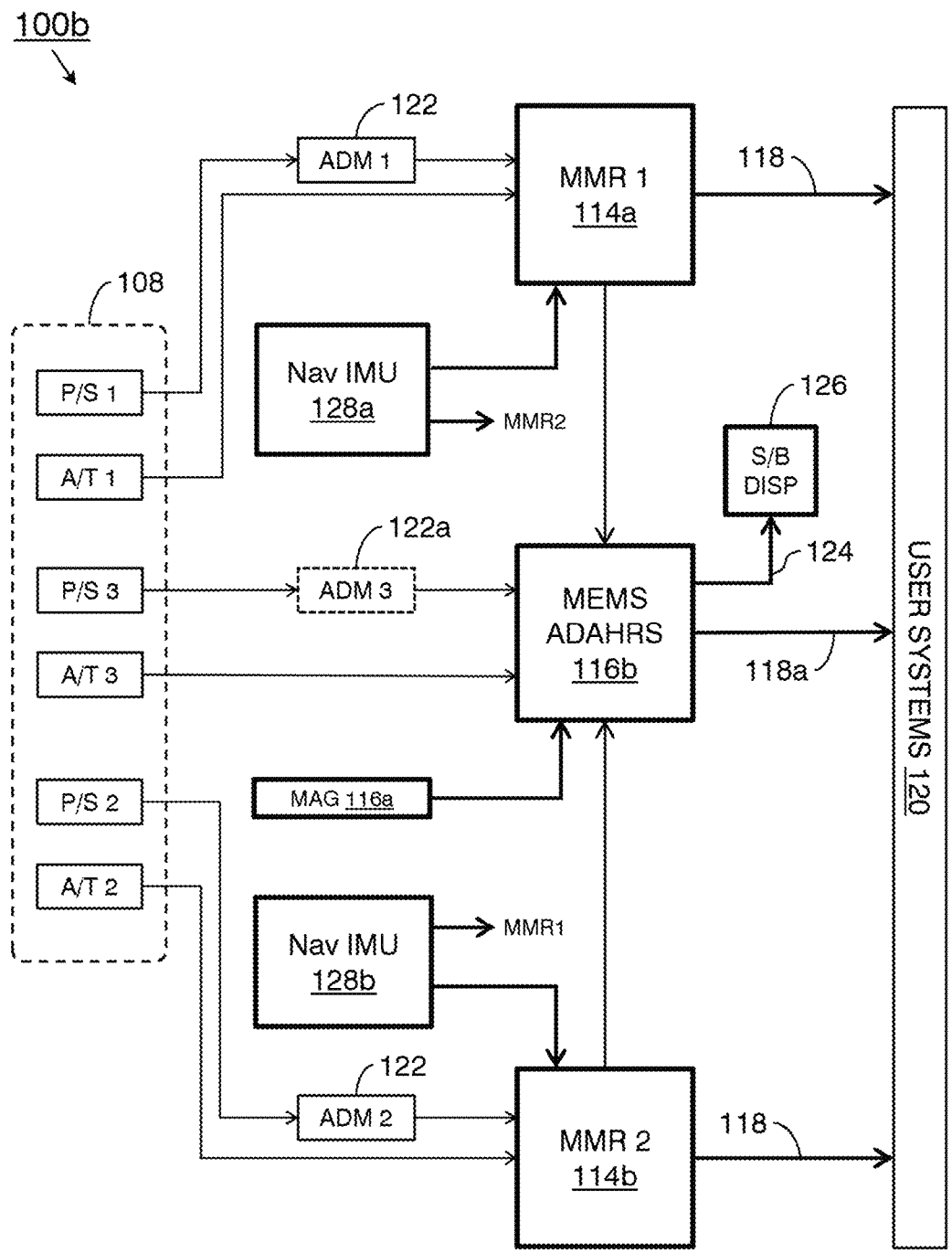
FIG. 3A illustrates the addition of a dissimilar third inertial sensor to the navigation system of FIG. 2.

Referring now to FIG. 3A, the navigation system 100b may be implemented and may function similarly to the navigation system 100a of FIG. 2, except that the navigation system 100b may replace the dual ADIRUs (104a-b, FIG. 2) with navigation-grade inertial measurement units (IMU) 128a-b (which lack the integrated processors of the ADIRUs 104a-b) and the MEMS IMU (116, FIG. 1) with a MEMS air-data attitude and heading reference system (ADAHRS) 116b. Each MMR 114a-b may receive inertial position data from the navigation-grade IMUs 124a-b, integrating the inertial position data with its own georeferenced position data (generated by dual-antenna GNSS receivers (106, FIG. 1) as described above) to generate primary integrated position solutions (118). Because inertial integration is performed within the MMRs 114a-b, the navigation-grade IMUs 128a-b may be isolated from GNSS frequency and constellation changes. The MEMS ADAHRS 116b may receive georeferenced position data from both MMRs 114a-b, emulating an ADIRU (104a-b, FIG. 2) by generating secondary integrated position solutions (118a) based on the georeferenced position data in addition to secondary inertial position data collected from, e.g., the magnetometer 116a or other secondary inertial sensors of the MEMS ADAHRS, providing a low-cost alternative to the navigation-grade IMUs 128a-b. Both MMRs 114a-b as well as the MEMS ADAHRS 116b may incorporate air data generated by ADMs 122 based on air data sensors 108; the MEMS ADAHRS 116b may receive air data generated by a dissimilar ADM (122a). The MEMS ADAHRS 116b may generate secondary pure inertial position solutions (124) by integrating secondary air data (from the dissimilar ADM 122a) and secondary inertial data from the MEMS ADAHRS 116b itself (as well as the magnetometer 116a and other secondary inertial sensors) and forward the secondary pure inertial position solutions 124 to the standby display 126, e.g., for use as a standby or backup source of position solutions in the event of a fault in one or both navigation-grade IMUs 128a-b. However, the MEMS ADAHRS 116b may output the secondary integrated position solutions (118a) as an additional primary channel to the user systems 120, due to the inherent dissimilarity of the secondary integrated position solutions 118a of the MEMS ADAHRS to the primary high-integrity position solutions (118) generated by the MMRs 114a-b.

Figure 3B:
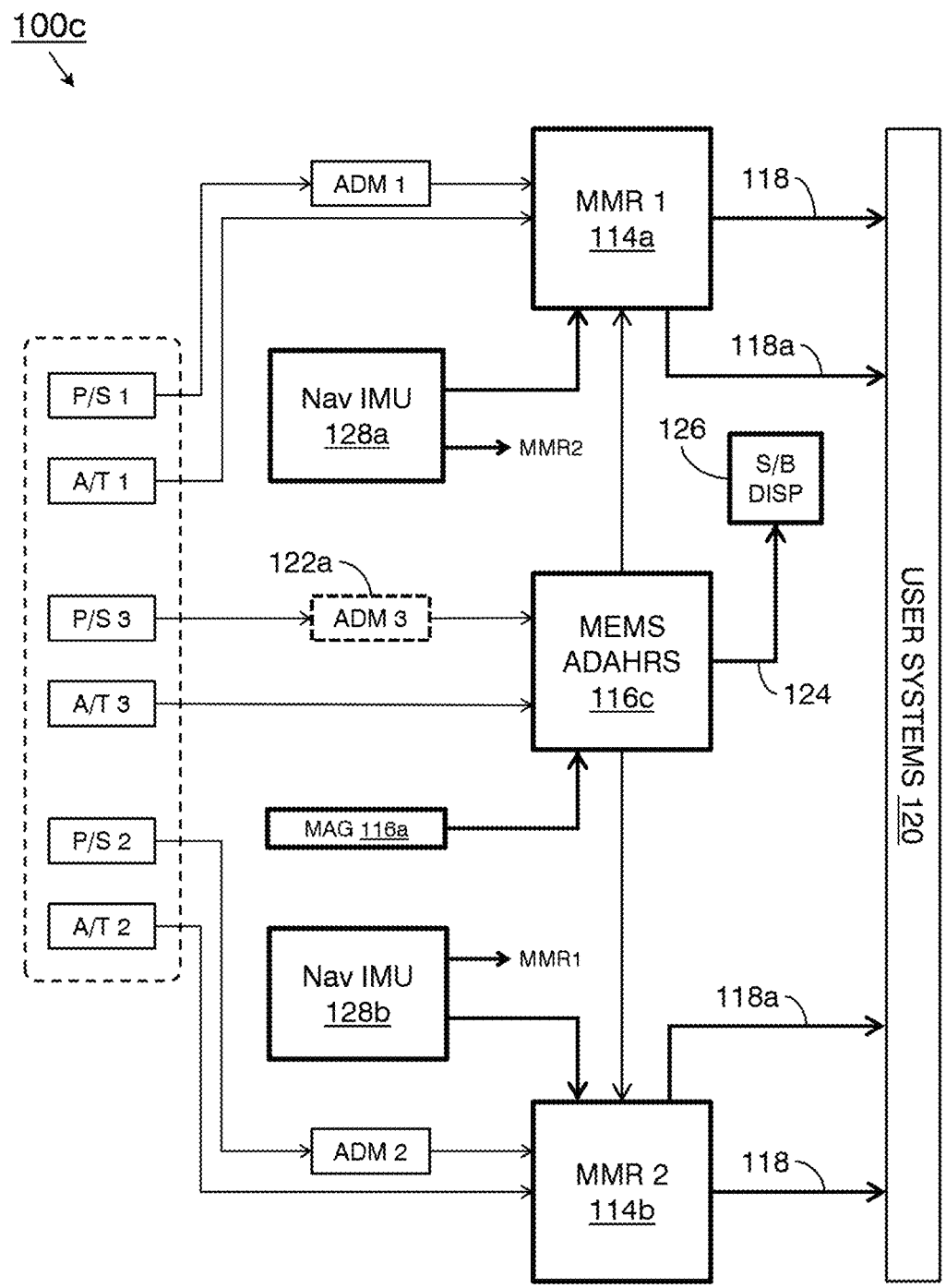
FIG. 3B illustrates an implementation of the navigation system of FIG. 3A wherein a GNSS-assisted AHRS does not generate integrated position solutions.

Referring now to FIG. 3B, the navigation system 100c may be implemented and may function similarly to the navigation system 100b of FIG. 3A, except that the navigation system 100c includes a MEMS ADAHRS 116c without the capacity for GNSS integration (as compared to the MEMS ADAHRS 116b of FIG. 2A). The MEMS ADAHRS 116c may output secondary inertial position data (collected by, e.g., the magnetometer 116a and other secondary inertial sensors of the MEMS ADAHRS) to each MMR 114a-b. Each MMR 114a-b may generate a dual-channel output to the user systems 120. For example, each MMR 114a-b may generate primary channel output (including primary integrated position solutions 118) based on the georeferenced position data generated by each MMR 114a-b and the primary inertial position data received from both navigation-grade IMUs 128a-b. Similarly, each MMR 114a-b may generate secondary channel output including secondary integrated position solutions (118a) based on the georeferenced position data and the secondary inertial position data generated by the MEMS ADAHRS 116c. The MEMS ADAHRS 116c may generate a secondary pure inertial position solution (124) based on secondary inertial position data and secondary air data from the dissimilar ADM 122a, forwarding the secondary pure inertial position solution 124 to the standby display 126.

Figure 4A:
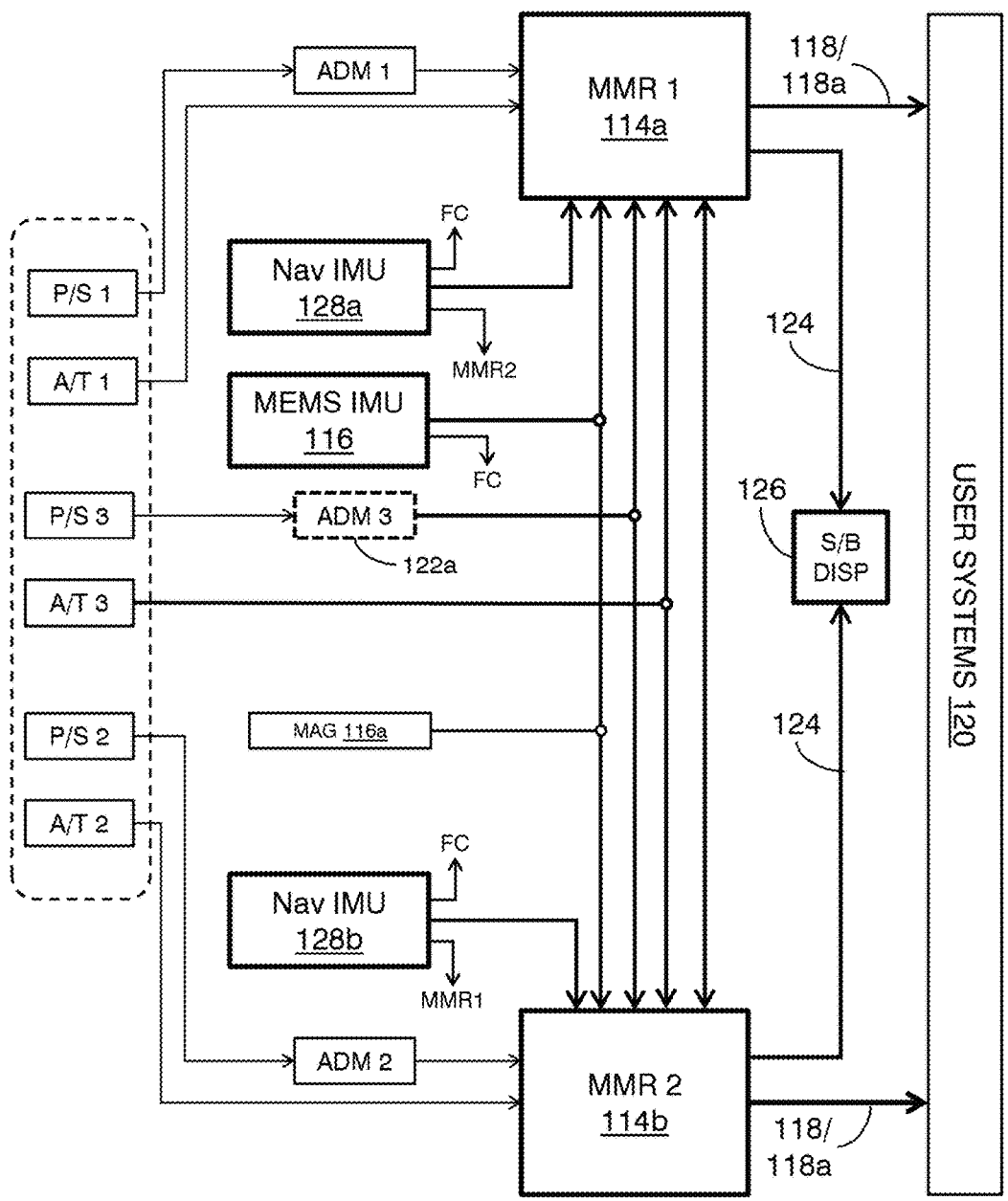
FIG. 4A illustrates a dual-channel implementation of the navigation system of FIG. 2.

Referring now to FIG. 4A, the navigation system 100d may be implemented and may function similarly to the navigation system 100a of FIG. 2, except that the ADIRUs (104a-b, FIG. 2) may be replaced by dual power supply MMRs 114a-b and navigation-grade IMUs 128a-b. Each MMR 114a-b may generate a dual-channel output to the user systems 120. For example, each MMR 114a-b may output a primary channel emulating an ADIRU (104a-b, FIG. 2) by integrating primary position solutions (118) based on georeferenced position data (based on position signals received by a dual-antenna GNSS receiver (106, FIG. 1)) and inertial position data generated by each navigation-grade IMU 128a-b. Each MMR 114a-b may receive secondary inertial position data from the MEMS IMU 116 (or, alternatively, from an AHRS/ADAHRS (116b-c, FIGS. 3A/3B)), generating a secondary integrated position solution (118a) based on secondary air data (from dissimilar ADM 122a) and secondary inertial position data from, e.g., the magnetometer 116a and the MEMS IMU 116, forwarding the secondary integrated solution to the user systems 120. Finally, each MMR 114a-b may generate a secondary pure inertial solution (124) based on the secondary inertial position data from the MEMS IMU 116 (and secondary air data from the dissimilar ADM 122a), forwarding the secondary pure inertial solutions 124 to the standby display 126. The user systems 120 may optionally receive pure inertial data (e.g., IMU rotation rates or accelerations) directly from the navigation-grade IMUs 128a-b via the MMRs 114a-b.

Figure 4B:
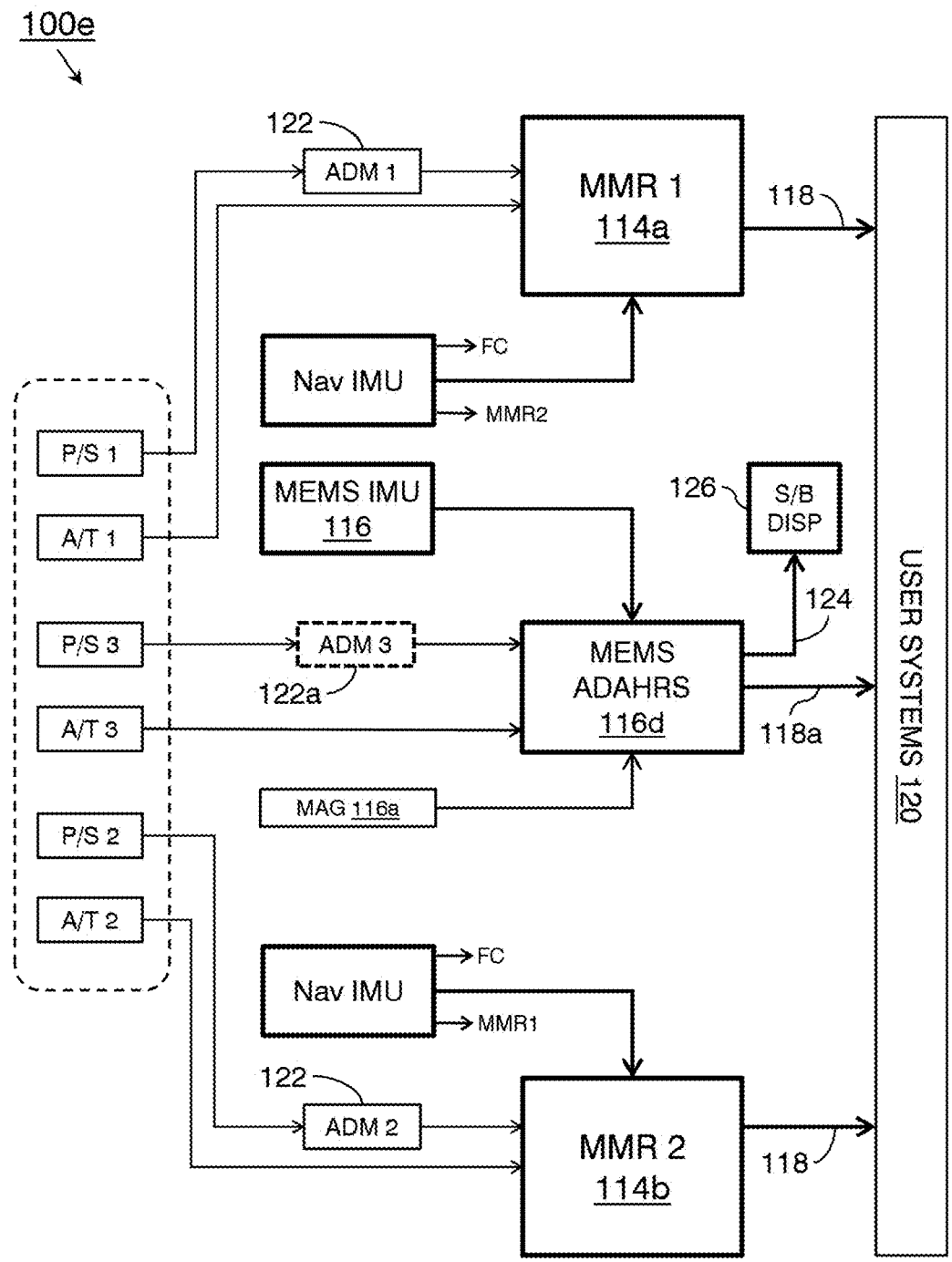
FIG. 4B illustrates the addition of a dissimilar third GNSS-assisted AHRS to the navigation system of FIG. 4A.

Referring now to FIG. 4B, the navigation system 100e may be implemented and may function similarly to the navigation system 100d of FIG. 4A, except that the navigation system 100e may output a third channel to the user systems 120 by including a MEMS ADAHRS 116d incorporating a dissimilar GNSS receiver (e.g., dissimilar to the dual-antenna GNSS receivers (106, FIG. 1) of the MMRs 114a-b). The MEMS ADAHRS 116d may generate a secondary integrated position solution (118a) based on secondary inertial position data from the MEMS IMU 116 and magnetometer 116a (and secondary air data generated by the dissimilar ADM 122a), providing the secondary integrated position solution 118a to the user systems 120 as well as providing the secondary pure inertial solution (124) to the standby display 126.

As will be appreciated from the above, systems and methods according to embodiments of the inventive concepts disclosed herein may provide for more cost-effective next-generation navigation systems with improved solution availability by replacing expensive navigation-grade IRUs and ADIRUs with lower-grade but high-performance MEMS inertial sensors and AHRS/ADAHRS. In addition, inertial sensors may be isolated from changes to GNSS frequencies and constellations, as inertial integration of position solutions is carried out by MMRs instead of by the IRUs.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A multi-mode receiver (MMR)-based navigation system, comprising:
at least one inertial reference unit (IRU) comprising:
at least one first inertial measurement unit (IMU) configured to generate first platform-referenced position data associated with an aircraft; and
at least one first processor coupled to the at least one first IMU and configured to output the first platform-referenced position data to at least one of a multi-mode receiver (MMR) associated with the aircraft and a user system of the aircraft;
at least one second IMU configured to generate second platform-referenced position data associated with the aircraft;
the at least one multi-mode receiver (MMR) coupled to the at least one IRU and the at least one second IMU and comprising:
at least one global navigation satellite system (GNSS) receiver configured to receive one or more satellite-based navigation signals from a source external to the aircraft; and
at least one second processor coupled to the GNSS receiver and configured to:
receive the at least one first platform-referenced position data from the at least one first IRU;
receive the second platform-referenced position data from the at least one second IMU;
generate georeferenced position data associated with the aircraft based on the one or more satellite-based navigation signals;
generate at least one first integrated position solution based on one or more of the georeferenced position data and the first platform-referenced position data;
generate at least one second integrated position solution based on one or more of the georeferenced position data and the second platform-referenced position data;
generate at least one pure inertial position solution based on the second platform-referenced position data;
output the at least one pure inertial position solution to a standby display; and
output one or more of the at least one first integrated position solution and the at least one second integrated position solution to the at least one user system.

2. The MMR-based navigation system of claim 1, wherein:
the at least one IRU includes at least one air-data IRU (ADIRU) coupled to at least one first air data module (ADM), the first ADM coupled to one or more air data sensors, the at least one first processor configured to:
receive first air data from the at least one first ADM; and
output the first air data to the at least one MMR;
and
the at least one MMR is coupled to at least one second ADM, the second ADM coupled to the one or more air data sensors, and the at least one second processor is configured to:
receive second air data from the at least one second ADM;
generate the at least one first integrated position solution based on one or more of the georeferenced position data, the first platform-referenced position data, and the first air data;
generate the at least one second integrated position solution based on one or more of the georeferenced position data, the second platform-referenced position data, and the second air data; and
generate the at least one pure inertial position solution based on one or more of the second platform-referenced position data and the second air data.

3. The MMR-based navigation system of claim 2, wherein the one or more air data sensors include one or more of a pitot tube, a static port, an angle of attack (AoA) sensor, and a total air temperature (TAT) sensor.

4. The MMR-based navigation system of claim 1, wherein the at least one second IMU includes at least one of a magnetometer, a compass, and a microelectromagnetic (MEMS) IMU.

5. A multi-mode receiver (MMR)-based navigation system, comprising:
at least one first inertial measurement unit (IMU) configured to generate first platform-referenced position data associated with an aircraft;

at least one MMR coupled to the at least one first IMU, the at least one MMR comprising:
  at least one satellite-based receiver configured to receive one or more satellite-based navigational signals from at least one source external to the aircraft;
  at least one first processor coupled to the at least one satellite-based receiver and configured to:
    generate georeferenced position data associated with the aircraft based on the one or more satellite-based navigational signals;
    receive the first platform-referenced position data from the at least one first IMU;
    generate at least one first integrated position solution based on one or more of the georeferenced position data and the first platform-referenced position data; and
    output the at least one first integrated position solution to the at least one user system;
and
at least one AHRS coupled to the at least one MMR and comprising:
  at least one second IMU configured to generate the second platform-referenced position data; and
  at least one second processor coupled to the at least one second IMU and configured to:
    receive the georeferenced position data from the at least one MMR;
    generate at least one second integrated position solution based on one or more of the georeferenced position data and the second platform-referenced position data;
    generate at least one pure inertial position solution based on the second platform-referenced position data;
    output the at least one second integrated position solution to the at least one user system; and
    output the at least one pure inertial position solution to at least one standby display.

6. The MMR-based navigation system of claim 5, wherein:
the at least one MMR is coupled to at least one first air data module (ADM), the first ADM coupled to one or more air data sensors, the at least one first processor configured to:
  receive first air data from the at least one first ADM; and
  generate the at least one first integrated position solution based on one or more of the georeferenced position data, the first platform-referenced position data, and the first air data;
and
the at least one AHRS is coupled to at least one second ADM, the second ADM coupled to the one or more air data sensors, the at least one second processor configured to:
  receive second air data from the at least one second ADM;
  generate the at least one second integrated position solution based on one or more of the georeferenced position data, the second platform-referenced position data, and the second air data; and
  generate the at least one pure inertial position solution based on one or more of the second platform-referenced position data and the second air data.

7. The MMR-based navigation system of claim 6, wherein the at least one first processor is configured to:

receive the second platform-referenced position data from the at least one AHRS;
generate the at least one second integrated position solution based on one or more of the georeferenced position data and the second platform-referenced position data; and
output the at least one second integrated position solution to the at least one user system.

8. The MMR-based navigation system of claim 6, wherein the one or more air data sensors include one or more of a pitot tube, a static port, an angle of attack (AoA) sensor, and a total air temperature (TAT) sensor.

9. The MMR-based navigation system of claim 5, wherein:
the at least one first IMU includes at least one navigation-grade IMU; and
the at least one second IMU includes at least one of a magnetometer, a compass, and a microelectromagnetic (MEMS) IMU.

10. A multi-mode receiver (MMR)-based navigation system, comprising:
at least one first navigation-grade inertial measurement unit (IMU) configured to generate first platform-referenced position data associated with an aircraft;
at least one second IMU configured to generate second platform-referenced position data associated with the aircraft, the second IMU including at least one of a magnetometer, a compass, and a microelectromagnetic (MEMS) IMU;
and
at least one MMR coupled to one or more of the at least one first IMU and the at least one second IMU, the at least one MMR comprising:
  at least one global navigation satellite system (GNSS) receiver configured to receive one or more navigational signals from at least one source external to the aircraft; and
  at least one first processor coupled to the at least one GNSS receiver and configured to:
    generate georeferenced position data associated with the aircraft based on the one or more navigational signals;
    receive one or more of the first platform-referenced position data and the second platform-referenced position data;
    generate at least one first integrated position solution based on one or more of the georeferenced position data and the first platform-referenced position data;
    generate at least one second integrated position solution based on one or more of the georeferenced position data and the second platform-referenced position data;
    generate at least one pure inertial position solution based on the second platform-referenced position data;
    output one or more of the at least one first integrated position solution and the at least one second integrated position solution to at least one user system associated with the aircraft; and
    output the at least one pure inertial position solution to at least one standby display associated with the aircraft.

11. The MMR-based navigation solution of claim 10, wherein:
the at least one MMR is coupled to at least one of a first air data module (ADM) and a second ADM, the first ADM and the second ADM coupled to one or more air data sensors, and the at least one first processor is further configured to:
receive first air data associated with the aircraft from the at least one first ADM;
receive second air data associated with the aircraft from the at least one second ADM;
generate the at least one first integrated position solution based on one or more of the georeferenced position data, the first platform-referenced position data, and the first air data,
generate the at least one second integrated position solution based on one or more of the georeferenced position data, the second platform-referenced position data, and the second air data; and
generate the at least one pure inertial position solution based on one or more of the second platform-referenced position data and the second air data.

12. The MMR-based navigation solution of claim 11, wherein the at least one MMR is a first MMR coupled to the at least one first IMU and comprising at least one first GNSS receiver, further comprising:
at least one air data attitude and heading reference system (ADAHRS) coupled to the at least one second IMU and the at least one second air data sensor, the at least one ADAHRS comprising:
at least one second GNSS receiver configured to receive the one or more navigational signals; and
at least one third processor coupled to the second GNSS receiver and configured to:
generate second georeferenced position data based on the one or more navigational signals;
receive the second platform-referenced position data from the at least one second IMU;
receive the second air data from the at least one second ADM; and
generate the at least one second integrated position solution based on one or more of the second georeferenced position data, the second platform-referenced position data, and the second air data.

13. The MMR-based navigation solution of claim 10, wherein the at least one first IMU is configured to output the first platform-referenced position data to the at least one user system.

14. The MMR-based navigation solution of claim 10, wherein the at least one second IMU is configured to output the second platform-referenced position data to the at least one user system.

15. The MMR-based navigation solution of claim 10, wherein the at least one user system includes one or more of a display system, a flight control system, a flight management system (FMS), and a fly-by-wire (FBW) system.

* * * * *